United States Patent
Sohn et al.

(10) Patent No.: US 6,895,682 B2
(45) Date of Patent: May 24, 2005

(54) POLAR COORDINATE-BASED PROFILOMETER AND METHODS

(75) Inventors: Alexander Sohn, Fuquay-Varina, NC (US); Kenneth P. Garrard, Raleigh, NC (US); Thomas A. Dow, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/290,919

(22) Filed: Nov. 8, 2002

(65) Prior Publication Data

US 2004/0088874 A1 May 13, 2004

(51) Int. Cl.[7] ............................................... G01B 5/20
(52) U.S. Cl. .......................................... 33/554; 33/549
(58) Field of Search ........................ 33/503, 504, 549, 33/551, 553, 554, 555, 566, 558, 559, 561, DIG. 2

(56) References Cited

U.S. PATENT DOCUMENTS

| | | | | |
|---|---|---|---|---|
| 3,624,684 A | * | 11/1971 | McCaslin | 33/124 |
| 4,099,800 A | * | 7/1978 | Bell et al. | 384/12 |
| 4,166,323 A | * | 9/1979 | Maag | 33/501.9 |
| 4,669,300 A | | 6/1987 | Hall et al. | |
| 4,799,316 A | * | 1/1989 | Tuss | 33/503 |
| 4,851,773 A | | 7/1989 | Rothstein | |
| 5,414,940 A | * | 5/1995 | Sturdevant | 33/559 |
| 5,705,741 A | | 1/1998 | Eaton et al. | |
| 6,026,583 A | | 2/2000 | Yoshizumi et al. | |
| 6,272,907 B1 | | 8/2001 | Neukermans et al. | |
| 6,354,012 B1 | * | 3/2002 | Pettersson | 33/503 |
| 6,434,846 B1 | * | 8/2002 | McMurtry et al. | 33/502 |
| 2002/0170196 A1 | * | 11/2002 | Takemura et al. | 33/551 |

* cited by examiner

Primary Examiner—Christopher W. Fulton
(74) Attorney, Agent, or Firm—Jenkins, Wilson & Taylor, P.A.

(57) ABSTRACT

A polar coordinate-based profilometer includes a base, a rotary stage, a linear stage, and a probe device. The rotary stage is mounted on the base and includes a rotary table rotatable about a vertical axis oriented orthogonal to the base. The linear stage is mounted on the rotary table and is rotatable therewith. The linear stage includes a linear slide member that is translatable along a radial axis orthogonal to the vertical axis. The probe device is mounted on the linear slide member and is translatable therewith. The probe device includes a probe tip that is linearly displaceable along the radial direction and communicates with a linear displacement-sensing transducer. Alternatively, the probe device scans an object without contacting the object. Methods are provided for measuring an object based on polar coordinates, and correcting for misalignment prior to measurement.

13 Claims, 9 Drawing Sheets

US 6,895,682 B2

POLAR COORDINATE-BASED PROFILOMETER AND METHODS

TECHNICAL FIELD

The present invention generally relates to the measurement of the surface profile of precision fabricated objects. More particularly, the present invention relates to the measurement of profiles by utilizing motorized polar coordinate axes.

BACKGROUND ART

As is generally known to persons skilled in the art, a profilometer is an instrument that performs form and roughness measurements on the outer surfaces of parts, workpieces, micro-scale articles and other types of objects. Typically, the profilometer includes a mounting component for holding an object while it is measured, a probe for measuring the shape of the object, and a motorized drive system for moving either the probe or the mounting component and object. The probe is usually either a mechanical instrument that contacts and traces a path over the outer surface of the object, or is an optical, non-contact instrument that scans the outer surface of an object. The probe is highly sensitive to deviations in the contour of the object being measured. The output signals produced by the probe during measurement are transmitted to an electronic processing unit, which conditions, amplifies, and otherwise processes the signals as appropriate to provide easily interpretable measurement data, surface plots, and/or any other useful output information.

The operation of profilometers has traditionally been based on Cartesian geometry, i.e., a two-dimensional X-Y or three-dimensional X-Y-Z rectangular coordinate system. However, the measurement of objects having large aspect ratios such as, for example, high-sag aspheric lenses, presents a significant challenge for commercially available Cartesian-based profilometers. It is known, for instance, that optical profilometers are slope-limited to a few degrees by the ratio of fringe spacing to resolution. Mechanical profilometers are typically limited by the clearance angle of their probe tips and the non-perpendicular loading direction of the probe, both of which often limit the measurable slopes to less than 45 degrees.

As an example of the limitations of conventional profilometers, FIG. 1A illustrates a probe 12 of a Cartesian-based mechanical profilometer measuring a hemispherical object 14 mounted to a flat surface 16. The object 14 has an arcuate outer surface 14A with a large range of slopes. The direction through which probe 12 traverses when tracing arcuate surface 14A is limited to the X-axis, and the direction through which probe 12 is deflected to sense the profile of arcuate surface 14A is limited to the Y-axis. It can be observed that measurements taken by probe 12 will be incorrect when its clearance face 12A, rather than its tip 12B, contacts object 14. By comparison, as shown in FIG. 1B, if probe 12 could be rotated through an angular direction θ so that its sensing direction R is radial and tip 12B remains in contact with arcuate surface 14A, accurate measurements of arcuate surface 14A could be performed.

Many precision-fabricated parts for which accurate profile measurement is desirable exhibit geometries that can be characterized as being more polar than Cartesian in nature, particularly objects having highly sloped outer surfaces such as arcuate surface 14A illustrated in FIGS. 1A and 1B. Examples include high aspect-ratio, aspheric optical components manufactured by the defense, information technology, and consumer products industries. Currently available Cartesian-based profilometers cannot measure such objects with a sufficiently high degree of precision. It would therefore be advantageous to provide a profilometer capable of effecting measurements of the outer surface of an object that are based on a polar coordinate system instead of the conventional Cartesian coordinate system.

DISCLOSURE OF THE INVENTION

The present invention provides a profilometer that employs a novel configuration of motorized axes to effect accurate measurement of precision fabricated objects. The operation of the profilometer is based on a polar coordinate system defined by radial (R) and angular (θ) axes rather than the conventional rectangular (i.e., Cartesian) coordinate system defined by orthogonal X and Y (or X, Y, and Z) axes. The profilometer comprises a radial positioning linear stage disposed on an angular positioning rotary stage. The linear stage and the rotary stage are preferably driven by brushless, frameless motors and their motions supported by air bearings to prevent disturbances from motor bearings and brushes and eliminate errors produced by conventional leadscrew configurations. The linear stage and rotary stage cooperatively establish the polar coordinate system upon which all measurement is based. A probe of any suitable high-precision design is disposed on the linear slide and is maintained as horizontal as possible to minimize motion- and gravitational-related errors. In one embodiment disclosed herein, the probe is of the contact type and is deflectable in the radial direction. The contact-type probe communicates with a suitable linear displacement transducer such as an air bearing LVDT (Linear-Variable Differential Transformer).

To measure a sample object, the linear and rotary stages are actuated to enable the probe to scan the surface of the sample object and generate an output indicative of measurements taken. In the case of a contact-type probe, the probe tip of the probe is brought into contact with the surface of the sample object. As the linear and rotary stages trace the probe tip along the outer surface of the sample object, the probe measures linear deflections of the probe tip, whereby an accurate profile of the outer surface of the sample object can be attained. To locate an object prior to measurement, the profilometer can include a conventional three-axis object positioning stage that is actuated by stepper motors and has a vertical mounting plate for affixing the object. According to one aspect of this method, the probe is actuated by the linear slide and rotary table to trace out a nominal surface shape of the object. As the object is being traced, the probe measures any deviations from this nominal path.

According to one embodiment, a polar coordinate-based profilometer comprises a base, a rotary stage, a linear stage, and a probe device. The rotary stage is mounted on the base and comprises a rotary table rotatable about a vertical axis oriented orthogonal to the base. The linear stage is mounted on the rotary table and is rotatable therewith. The linear stage comprises a linear slide member that is translatable along a radial axis orthogonal to the vertical axis. The probe device is mounted on the linear slide member and is translatable therewith. The probe device in one aspect is a contact-type probe that comprises a linear displacement-sensing transducer and a probe tip. The probe tip is linearly displaceable along the radial axis and communicates with the transducer. Thus, as described hereinbelow, the polar coordinate θ is given by the rotary axis position and the radial position R is the sum of the linear axis position r and the probe displacement ρ.

A method is provided for measuring a surface of an object. An object is placed in a fixed position relative to a polar coordinate-based profilometer. The profilometer comprises a rotary stage rotatable about a vertical axis, a linear stage mounted on the rotary stage and rotatable therewith, and a probe device. The linear stage comprises a linear slide member that is translatable along a radial axis orthogonal to the vertical axis. The probe device is mounted on the linear slide member and is translatable therewith. The probe device comprises a sensor for measuring surfaces. The probe device is moved relative to a surface of the object by activating the rotary stage to rotate the probe device through an angular position relative to the vertical axis and activating the linear stage to translate the probe device along the radial axis. The rotary stage and the linear stage respectively generate angular position and radial position data indicative of the path traversed by the probe device. While the probe device is moved relative to the object surface, the sensor is caused to measure the object surface. The probe device generates measurement data indicative of deviations in the object surface. A profile of the measured object surface is generated based on the generated measurement data as a function of the generated angular and radial position data.

According to another method for measuring a surface of an object, an object is fixed so as to contact the probe tip of the polar coordinate-based profilometer. The profilometer comprises a rotary stage, a linear stage, and a probe device. The rotary stage is rotatable about a vertical axis. The linear stage is mounted on the rotary stage and is rotatable therewith. The linear stage comprises a linear slide member translatable along a radial axis orthogonal to the vertical axis. The probe device is mounted on the linear slide member and is translatable therewith. The probe tip communicates with the probe device and is linearly displaceable along the radial axis. The probe tip is moved along a surface of the object by activating the rotary stage to rotate the probe device through an angular position relative to the vertical axis, and activating the linear stage to translate the probe device along the radial axis. While moving, the rotary stage, the linear stage and probe respectively generate angular position and radial position data indicative of the path traversed by the probe tip. While the probe tip is moved along the object surface, the probe device measures the object surface by detecting linear displacement of the probe tip. The probe device generates displacement data indicative of the detected linear displacement. A profile of the measured object surface is generated, based on the generated displacement data as a function of the generated angular and radial position data. In a preferred aspect of this method, the rotary stage and the linear stage actuate the probe tip to move along the object surface according to a nominal profile that is predetermined for the object. The displacement data generated by the probe device indicates deviations of the object surface from the nominal profile. In another method, the probe is actuated along the surface by rotation of the rotary stage with the linear stage position determined by the displacement of the probe in order to limit displacement from null thereof.

A method is also provided for measuring and compensating for misalignment of a probe device of a polar coordinate-based profilometer relative to a polar coordinate origin. According to this method, an origin of a polar coordinate system is fixed by providing a rotary stage that is rotatable about a vertical axis. The origin coincides with the vertical axis. A flat surface is placed in contact with a probe tip of a probe device. The probe device is mounted on a linear stage. The linear stage is mounted on the rotary stage and is rotatable therewith. The linear stage comprises a linear slide member translatable along a radial axis that is oriented orthogonal to the vertical axis. The probe tip is linearly displaceable along the radial axis. The probe device is rotated by actuating the rotary stage while maintaining contact between the probe tip and the flat surface. The probe device detects linear displacement of the probe tip and generates displacement data indicative of the detected linear displacement. If the displacement data indicates that the probe tip is offset from the defined origin, an adjustment is made to compensate for the offset. According to an aspect of this method, radial and tangential offsets are compensated for by resetting the origin based on polar coordinates describing the offset position of the probe tip.

It is therefore an object of the invention to provide a profilometer that is structured to make measurements according to a polar coordinate-based system.

It is another object of the invention to provide a method for measuring objects based on a polar coordinate system.

It is yet another object of the invention to provide a method for compensating for misalignment of a surface measuring probe and the polar coordinate origin of a polar coordinate-based profilometer.

Some of the objects of the invention having been stated hereinabove, and which are addressed in whole or in part by the present invention, other objects will become evident as the description proceeds when taken in connection with the accompanying drawings as best described hereinbelow.

DETAILED DESCRIPTION OF THE INVENTION

Figure 1A:
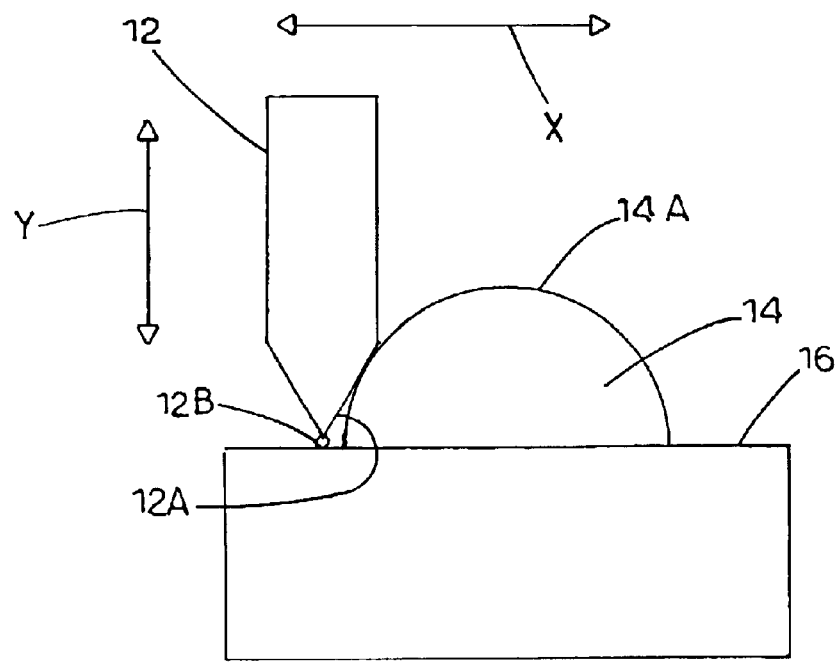
FIG. 1A is a diagram of a probe measuring a surface in accordance with a rectangular coordinate system.
Figure 1B:
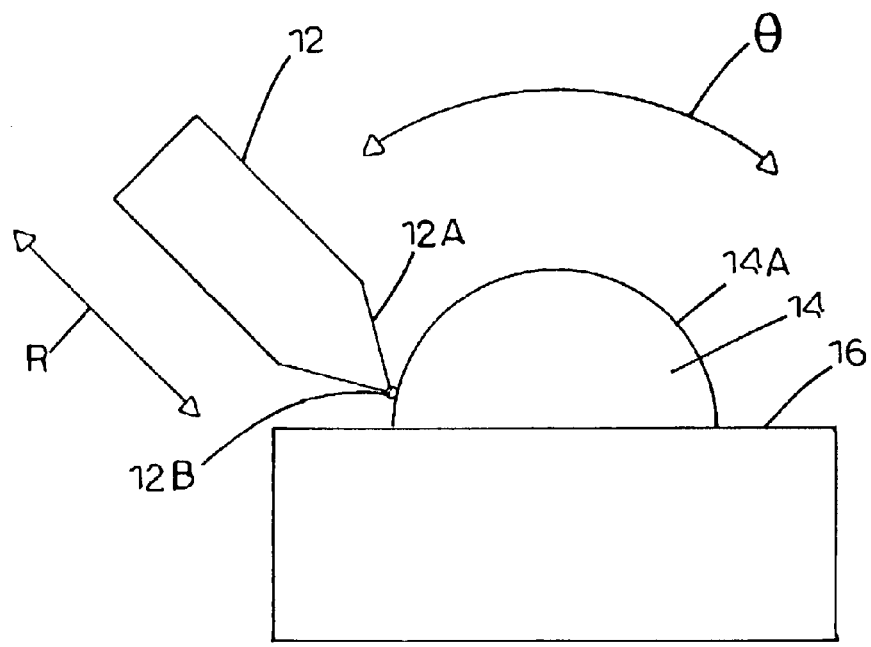
FIG. 1B is a diagram illustrating a probe measuring a surface in accordance with a polar coordinate system.
Figure 2:
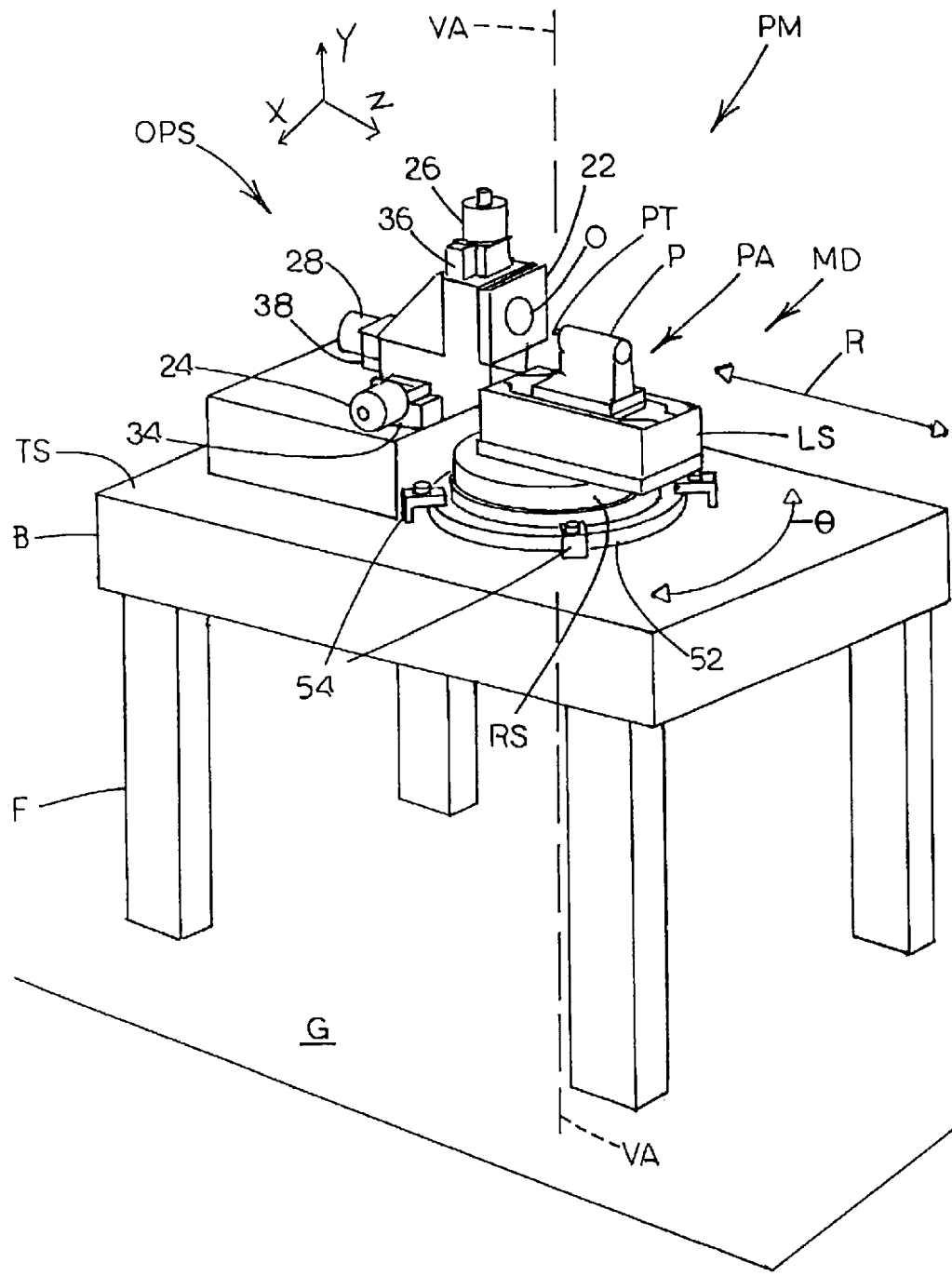
FIG. 2 is a perspective view of a profilometer according to an embodiment disclosed herein.

Referring now to FIG. 2, a profilometer, generally designated PM, is illustrated in accordance with an embodiment of the invention. Profilometer PM comprises an isolation base B; a polar coordinate-based measurement device, generally designated MD, for measuring a test object O; and an object positioning stage, generally designated OPS, for positioning object O in preparation for measurement by measurement device MD and holding object O in a fixed position during measurement. Measurement device MD and object positioning stage OPS are supported by base B and disposed in close proximity to each other, but operate independently of each other.

As will be appreciated by persons skilled in the art, measurement device MD communicates with a suitable electronic control device EC (see FIG. 5), such as a CPU or other digital logic-based control device, to receive feedback from and control the moving components of measurement device MD. Preferably, electronic control device EC controls measurement device MD by executing instructions given by software that either is stored in the system memory of electronic control device EC or on a computer-readable medium interfaced with electronic control device EC. Object positioning stage OPS can also communicate with electronic control device EC, or can be controlled by a separate control module. If, however, object positioning stage OPS is controlled by a separate control module, then a means of communication between the two controllers must be provided. Semi-automated measurement setup (i.e., part alignment, calibration, and the like) requires specific motions of object positioning stage OPS in coordination with probe location. In one specific embodiment, electronic control device EC is provided in the form of a UMAC system with motion control and data collection capability, which is commercially available from Delta-Tau Data Systems, Inc., Chatsworth, Calif.

Continuing with FIG. 2, Isolation base B is supported by a frame assembly F disposed on a level ground surface G. Preferably, base B is constructed from a solid, heavy material such as granite to dampen or cancel any vibrations and/or thermal effects resulting from the operation of the moving components of profilometer PM. As one example, vibration isolation can be provided by a self-leveling Precision-Aire™ table supporting base B, the table being commercially available from Fabreeka International, Inc., Stoughton, Mass.

Measurement device MD comprises a rotary stage RS, a linear stage LS, and a probe assembly, generally designated PA, all of which include movable components that must be mounted in a manner preventing significant deflection due to the forces of motion and gravity. Rotary stage RS is mounted on or in base B and is rotatable through an angle θ relative to a central, vertical axis VA of rotation that is orthogonal to base B and ground surface G. Vertical axis VA of rotary stage RS defines and fixes the origin of the polar coordinate system on which the operation of measurement device MD is based. Linear stage LS is mounted directly on the top of rotary stage RS and is linearly translatable along a radial axis R. Probe assembly PA is mounted on the top of linear slide LS and is linearly translatable therewith along radial axis R. Through this stacked architecture illustrated in FIG. 2, it can be observed that probe assembly PA, linear stage LS, and rotary stage RS, are all mechanically referenced to vertical axis VA and thus the origin of the polar coordinate system, thereby enhancing the precision and flexibility of measurements taken by profilometer PM.

Object positioning stage OPS is provided to mount and position test object O in a predetermined relation to probe assembly PA prior to measurement of test object O by measurement device MD. Object positioning stage OPS includes a vertically oriented mounting plate 22 of any suitable design for affixing test object O in a secure fashion. Object positioning stage OPS can have any conventional configuration suitable for controllably positioning test object O in three-space relative to probe assembly PA. Accordingly, in the exemplary embodiment illustrated in FIG. 2, object positioning stage OPS includes first, second and third microstepping stepper motors 24, 26 and 28, respectively, and associated ball-bearing slide assemblies 34, 36 and 38 for moving mounting plate 22 and thus test object O through the X, Y and Z axes. Preferably, object positioning stage OPS can locate a test object O with a positioning resolution of less than 1 $\mu$m in the X-, Y- and Z-directions, although this does not directly impact the measurement accuracy. One example of a suitable object positioning stage OPS is a NEAT™ device commercially available from Danaher Precision Systems, Salem, N.H.

Figure 3:
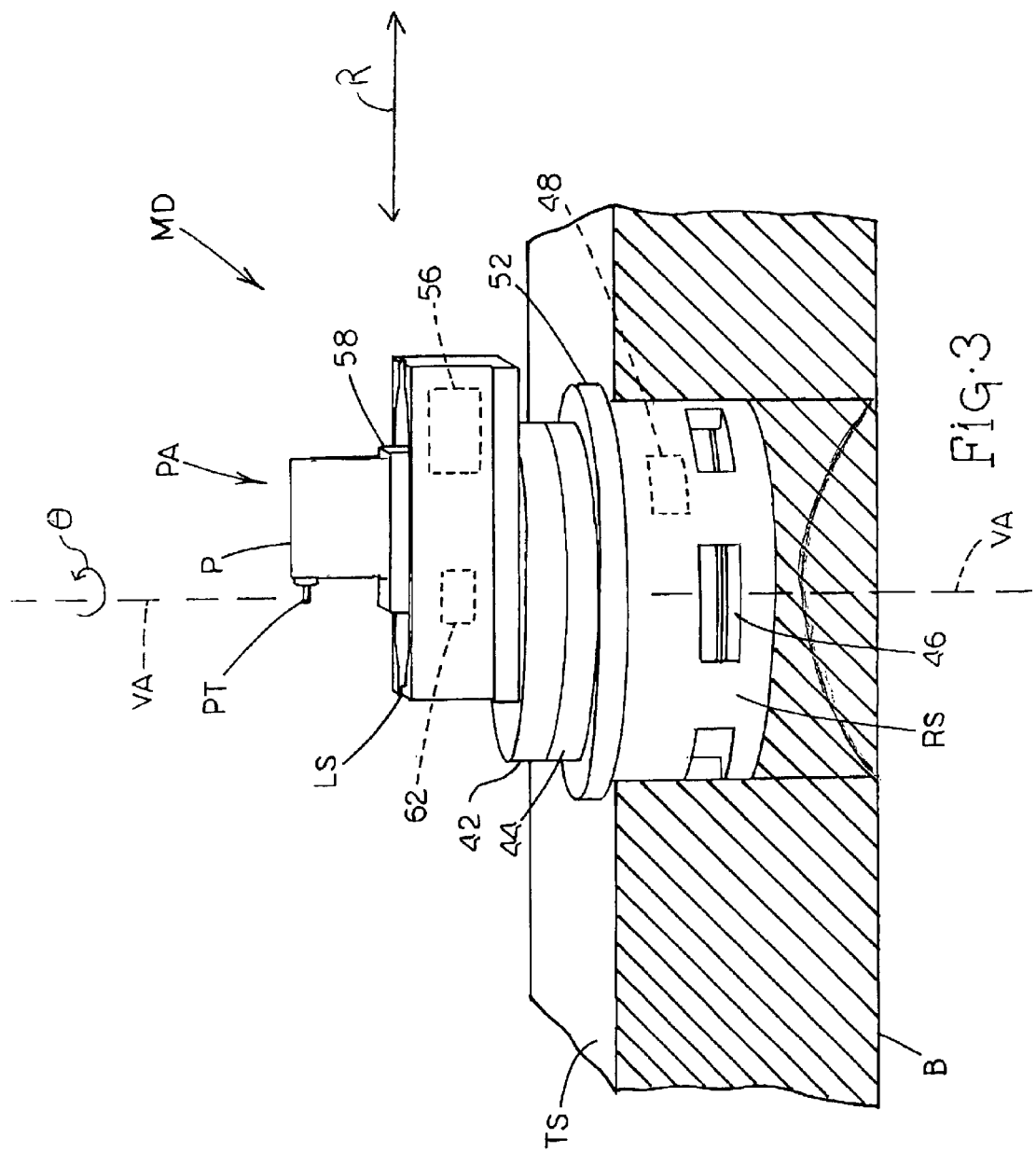
FIG. 3 is a side elevation view of a polar coordinate-based measurement device that can be provided with the profilometer.

Referring now to FIG. 3, rotary stage RS can be any commercially available high-precision rotary table device. Rotary stage RS includes a rotary table 42 rotatably supported by an air bearing internally created by components within a housing 44. Rotary table 42 is driven by a motor 46. The angular position and rotation of rotary table 42 are monitored by a rotary encoder 48. One example of a rotary device suitable for use as rotary stage RS is commercially available from Precitech, Inc, Keene, N.H. The exemplary rotary device includes a 270-mm-diameter rotary table surface that is driven by brushless, frameless, direct-drive motor commercially available from Aerotech, Inc., Pittsburgh, Pa., and is equipped with a high-resolution (0.9 $\mu$rad) optical encoder commercially available from Heidenhain GmbH, Traunreuth, Germany.

As illustrated in FIG. 3, it is preferable that motor 46, encoder 48, and at least a portion of housing 44 where the air bearing is located be mounted below a top surface TS of base B. This configuration minimizes the height of rotary table 42 above top surface TS, and thus minimizes offsets in the vertical direction to reduce inaccuracies associated with rotary stage RS tilt errors. In addition, any thermal growth due to heat dissipation from motor 46 occurs below the air bearing, thereby minimizing thermally induced errors. To provide access to motor 46 and encoder 48 for making adjustments, testing, or the like, the entire assembly of rotary stage RS is removable from base B and hence can be operated independently from base B and other components of profilometer PM. By way of example, this removability can be made possible by securing a flanged portion 52 of rotary stage RS to base B using adjustable clamping elements 54, as shown in FIG. 2.

Continuing with FIG. 3, linear stage LS can be any air bearing-equipped, high-precision linear translation device. The primary components of linear stage LS include a motor 56 that drives a linear slide 58. The radial position and translation of linear slide 58 relative to rotary table 42 are measured by a linear encoder 62. One example of a linear slide device suitable for use as linear stage LS is commercially available as the ES-500 model from Dover Instrument Corporation, Westboro, Mass., which is equipped with an integrated brushless, frameless linear motor and a Heidenhain optical encoder with a resolution of 20 nm.

Figure 4:
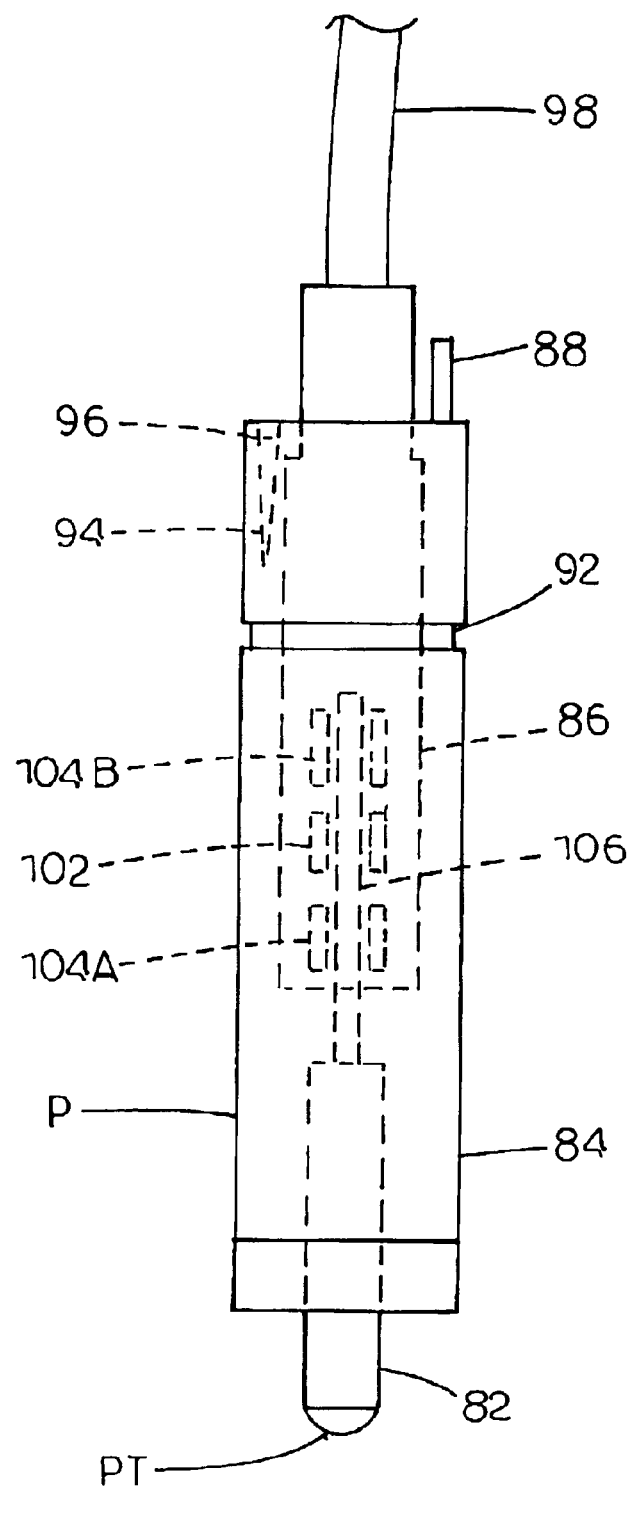
FIG. 4 is a top plan view of a probe device and internal features thereof that can be provided with the profilometer.

Referring now to FIG. 4, probe assembly PA comprises a probe device P of any suitable high-precision design. In one embodiment, probe device P is adapted for contacting a test object O (see FIG. 2). The contact-type probe device P preferably comprises an interchangeable probe tip PT screwed onto stylus 82 that is linearly deflectable within an internal bore of a probe housing 84. Probe tip PT can be any small-radius element suitable for resolving features as small as 1 μm as well as measuring form error. Preferably, probe tip PT is a conical diamond having a tip radius of approximately 1 μm. Preferably, stylus 82 is a square shaft contained within a square bore of probe housing 84 so that stylus 82 and probe tip PT cannot rotate about the axis of stylus 82. Stylus 82 communicates with a linear displacement transducer 86. The air bearing of probe device P is created by a thin, pressurized air envelope, which also controls probing force. Air is introduced through an intake port 88 and into the clearance space between stylus 82 and an interior surface of probe housing 84, and can be exhausted through an exhaust slot 92.

The probing force can be adjusted to 0.1 mN (10 mg). As shown in FIG. 4, probe device P includes a needle valve 94 communicating with its pneumatic circuit. Needle valve 94 is attached to a set screw 96 that is used to adjust air pressure and thus probing force. To make a coarse adjustment of probing force, set screw 96 is rotated. To make a fine adjustment of probing force, the air pressure in the supply line connected to intake port 88 can be adjusted by a precision air regulator. The probing force can be accurately measured by adjusting probe device P to zero probing force at zero displacement and placing a flexure of known stiffness in contact with probe tip PT. As air pressure is increased, the deflection of the flexure is measured by transducer 86. Increasing the air pressure increases the deflection of the flexure, and therefore increases the probing force. The probing force will be proportional to the known spring constant of the flexure, and thus the probing force can be calculated.

Transducer 86 can be any suitable high-precision transducer that senses linear displacement and transforms the displacement into an electrical signal corresponding to the magnitude of the linear displacement, with the electrical signal being outputted via an electrical conduit 98. Preferably, transducer 86 is a linear-variable differential transformer (LVDT), the basic structure and operation of which are well known to persons skilled in the art. Typically, the LVDT includes one primary coil 102 and two secondary coils 104A and 104B wound around a common core or armature 106 formed from a magnetic material such as iron. Armature 106 is free to move linearly along the axis of primary coil 102 and secondary coils 104A and 104B. An AC voltage is applied to primary coil 102. A voltage is induced in each secondary coil 104A and 104B proportional to the relative length of armature 106 that couples armature 106 to that secondary coil 104A and 104B. Secondary coils 104A and 104B are disposed on opposite ends of primary coil 102, and are connected so as to produce a zero (i.e., null) output voltage when armature 106 is centered. When, however, armature 106 is displaced off center in the direction of either secondary coil 104A or 104B, the output voltage will be proportional to the magnitude of this displacement and phased to indicate whether the displacement is in the forward or rearward direction. One example of a suitable LVDT is an air-bearing LVDT system commercially available from Lion Precision, St. Paul, Minn., as model AB-01. This LVDT has a linear range of 1 mm and a resolution of up to 1.2 nm, and is capable of loads as small as 0.1 mN when oriented horizontally.

As an alternative to employing a contact-type probe device P, a non-contact-type probe device P could be provided. In such a case, probe device P would be actuated to scan, but not physically trace, the surface of a test object O to provide measurement data. Non-limiting examples of non-contact-type probe devices P include optical, capacitive, and eddy current-based sensors. The structure and operation of such non-contact-type probe devices P are known to persons skilled in the art.

In practice, profilometer PM in at least one exemplary embodiment is capable of measuring figure as well as roughness on spherical, hemispherical, and aspherical objects having either concave or convex surfaces, and any features having an included angle of 180° or more. The topology of flat objects can also be measured. The range of linear stage LS is ±30 mm in the radial direction, and the range of rotary stage RS is ±90° in the angular direction. Profilometer PM is operable within a circular measurement field that is 60 mm in diameter, and can measure surfaces to a resolution of 20 nm and an overall accuracy of 100 nm over this measurement field.

Figure 5:
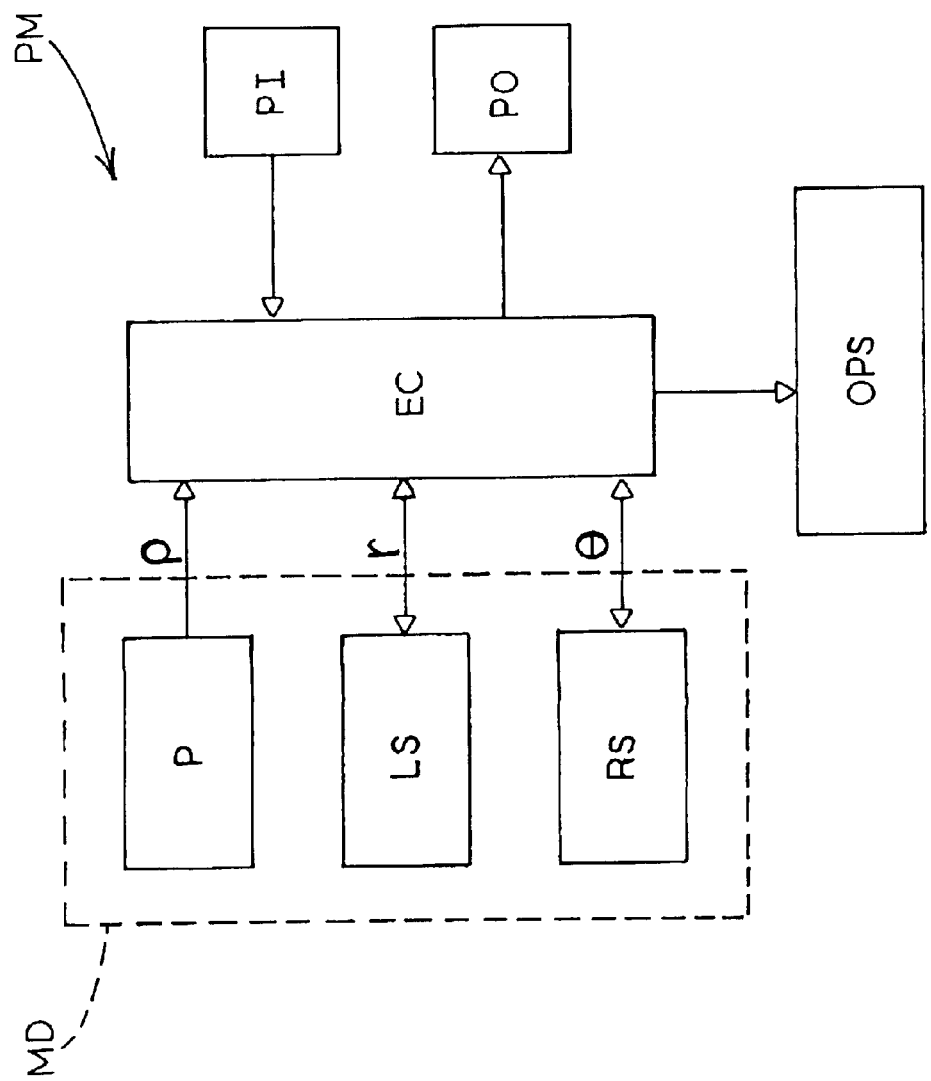
FIG. 5 is a schematic diagram of the profilometer interfaced with an electronic control device.

Referring now to FIG. 5, a simplified system-level schematic diagram of profilometer PM is illustrated. As described previously, electronic control device EC can be any suitable microcontroller. Typically, as is appreciated by persons skilled in the art, electronic control device EC can include a programmable central processing unit (CPU) and associated memories, such as a random access memory (RAM) or other dynamic storage device for data and read-only memory (ROM) and/or electrically erasable read-only memory (EEPROM) for program storage. In accordance with the embodiments herein, the software stored in the memory of electronic control device EC can be any microcode suitable for receiving, processing, and interpreting signals transmitted from measurement device MD. The software can also include the executable program instructions needed for controlling the motions of measurement device MD and, optionally, object positioning stage OPS as well. A separate motion control module with hard circuitry for executing motion control could be interfaced with, and hence considered a part of, electronic control device EC. As is further appreciated by skilled artisans, electronic control device EC can receive input from any suitable peripheral input device PI such as a keyboard, mouse, and/or the like, and can provide output to any suitable peripheral output device PO such as a monitor, printer, and/or the like. The specific details needed to realize a system in which profilometer PM is interfaced with and controlled by electronic control device EC are readily known to persons skilled in the art.

As further illustrated schematically in FIG. 5, in the operation of profilometer PM during which probe device P is tracing a test object O (see FIG. 2), linear stage LS and rotary stage RS of measurement device MD provide positional feedback to electronic control device EC based on linear and rotary axis positions r and θ, respectively. In addition, probe device P provides output signals to electronic control device EC indicative of a deviation ρ from the null setting of probe device P. Electronic control device EC processes these input data to record deviations ρ as a function of position r and θ, transforms the data into a measured surface profile for test object O, and displays the data as a two-dimensional error plot or any other useful expression of the measurements performed by measurement device MD.

Figure 6:
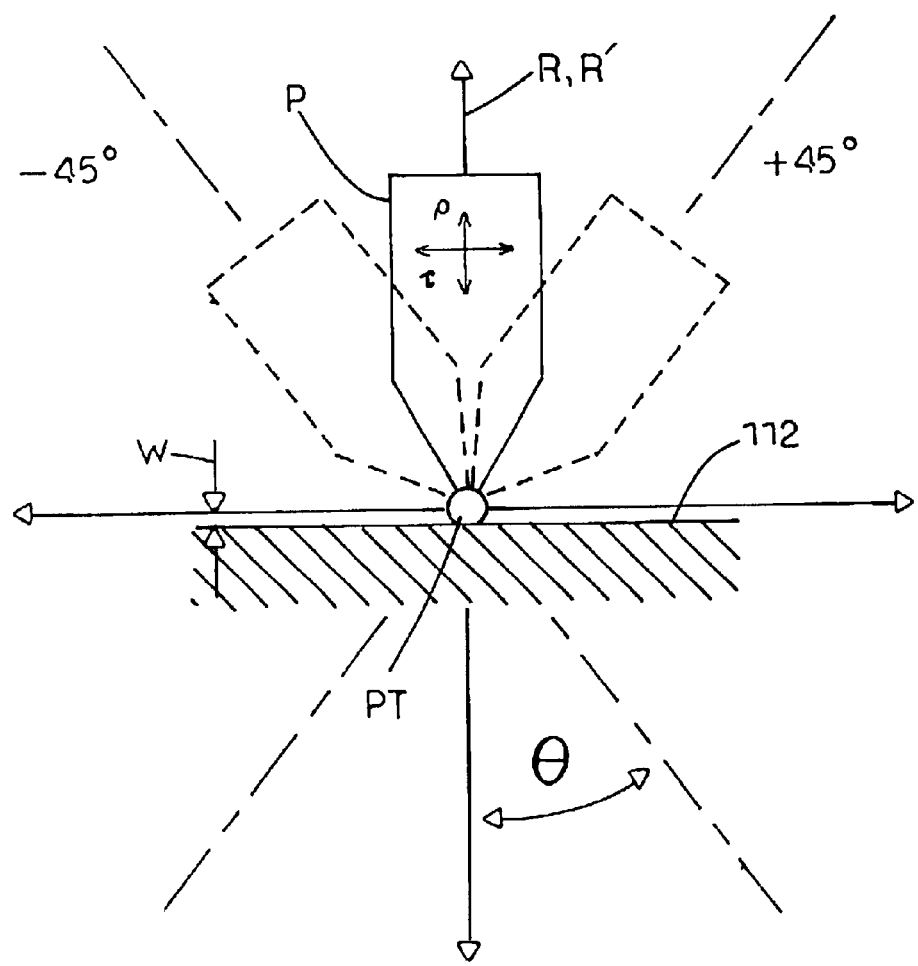
FIG. 6 is a diagram illustrating a method for aligning the probe device with the origin of the polar coordinate system on which measurements taken by the profilometer are based.

Prior to activating measuring device MD to measure the surface of test object O (see FIG. 2), the origin of the coordinate axes R and θ of profilometer PM must be aligned with probe device P. Referring to FIG. 6, the primary criterion for this alignment is that the output of probe device P must be zero at r=0 for all positions of θ, where ρ indicates the deflection of probe tip PT in the radial direction. This means that for a probe tip PT with a radius of w, probe device P should have a constant output of −w for all positions of θ if the position of probe tip PT is truly centered at R=0. As illustrated in FIG. 6, the alignment of probe device P with the origin (R=0, θ=0) of profilometer PM can be validated by placing a precision machined flat plate 112 in contact with probe tip PT, such that the surface of flat plate 112 is positioned at −w, i.e., is known to be offset from the center of probe tip PT by a radial distance equal to the radius of probe tip PT. If probe device P is truly centered at the origin, the output of probe device P will not change as probe device P is caused to traverse the rotary axis from −45° to +45°. If, on the other hand, there is an offset in the radial ρ-direction and/or the tangential τ-direction, the output of probe device P will change in a characteristic way for each direction. In the case of an offset, probe device P is used to determine the coordinate location of the offset ($\rho_0$, $\tau_0$) relative to the true origin (0, 0). Initially, coarse alignment can be obtained by manual adjustment of probe assembly PA with respect to linear slide LS. Preferably, the offset is fully addressed by compensating for the offset in the software provided with profilometer PM, such as by resetting the system so that the measured offset location is accounted for in all subsequent measurements.

Figure 7A:
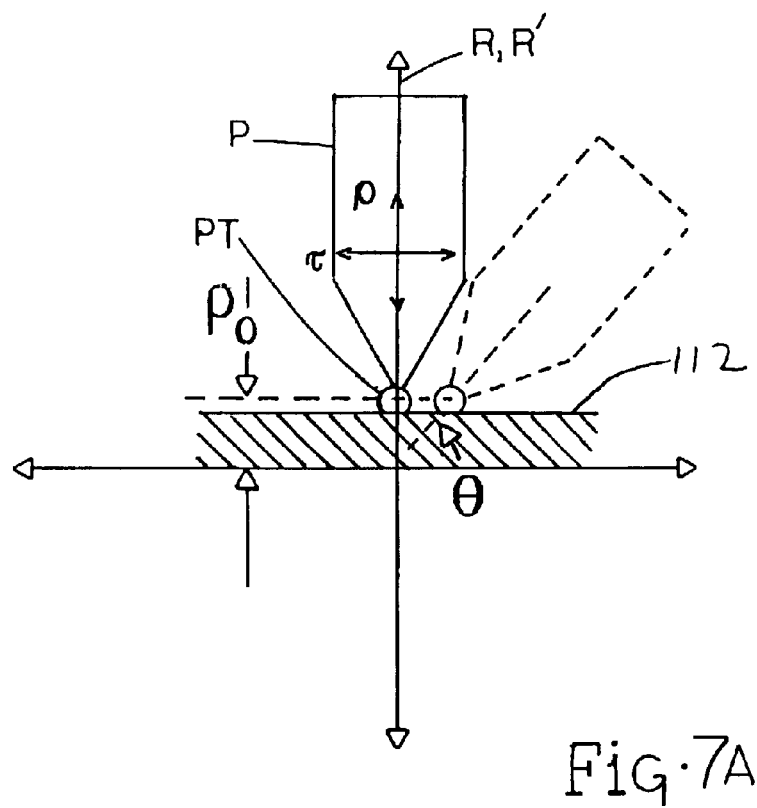
FIG. 7A is a schematic diagram illustrating the detection by the probe device of a radial offset from the origin of the polar coordinate system.

FIG. 7A illustrates the case where probe tip PT is offset by a radial distance $\rho_0$ in the ρ-direction. In this case, the output of probe device P will change as a function of the rotary axis position θ according to the following equation:

$$\rho = \rho_0 \left( \frac{1}{\cos\theta} - 1 \right).$$

Figure 7B:
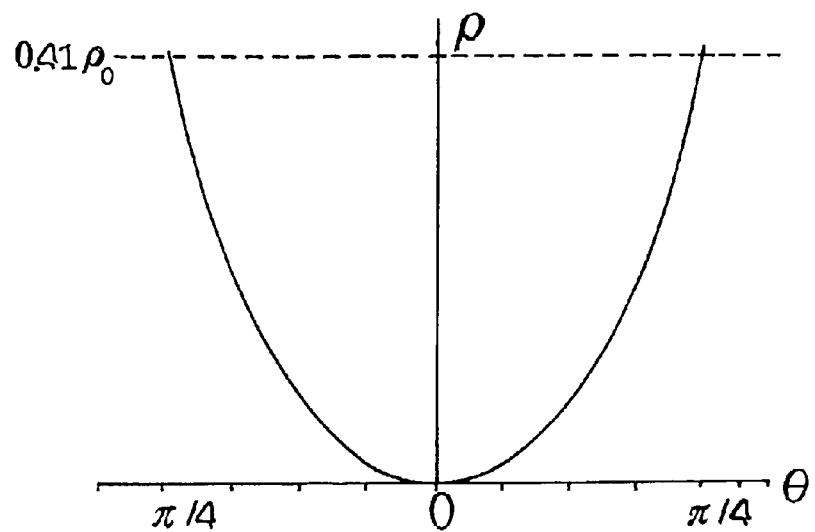
FIG. 7B is a graph illustrating the response of the probe device to the detection of radial offset as a function of angular position.

The plot of the deflection of probe device P as a function of angular position θ for this case is illustrated in FIG. 7B. The measurement of this ρ-offset value indicates that probe device P is misaligned in the ρ-direction, and can be used to detect and correct the offset. The offset can be eliminated by resetting the R-axis of profilometer PM to zero. As will be appreciated by persons skilled in the art, this compensation or adjustment can be made through software provided with profilometer PM.

Figure 8A:
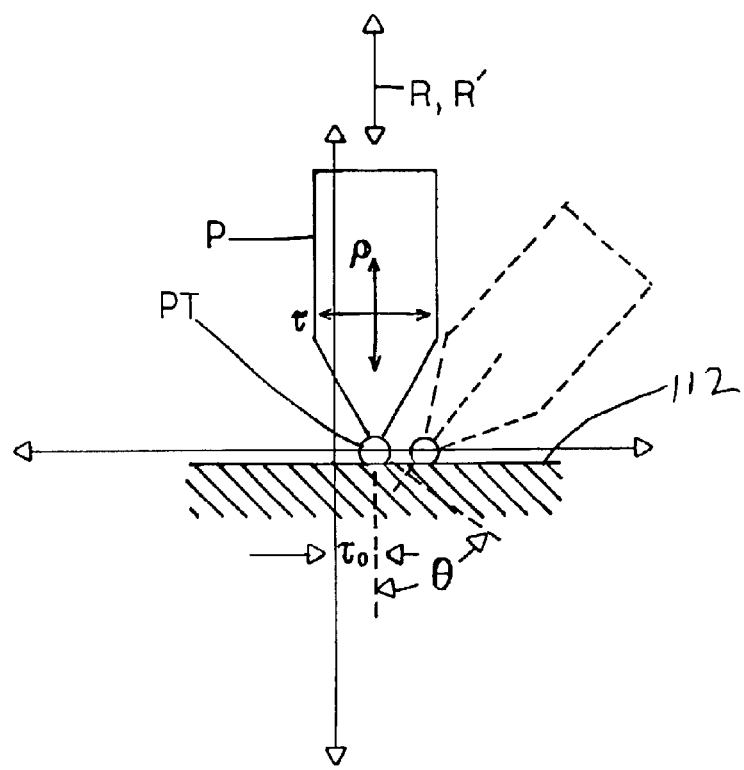
FIG. 8A is a schematic diagram illustrating the detection by the probe device of a tangential offset from the origin of the polar coordinate system.

FIG. 8A illustrates the case where probe tip PT is offset by a tangential distance $\tau_0$ in the τ-direction, which is orthogonal to the R-axis of profilometer PM. The τ-offset produces a different response by probe device P than the ρ-offset. In the case of a detected τ-offset, the output of probe device P will change as a function of the rotary axis position θ according to the following equation:

$$\rho = \tau_0(\tan\theta).$$

Figure 8B:
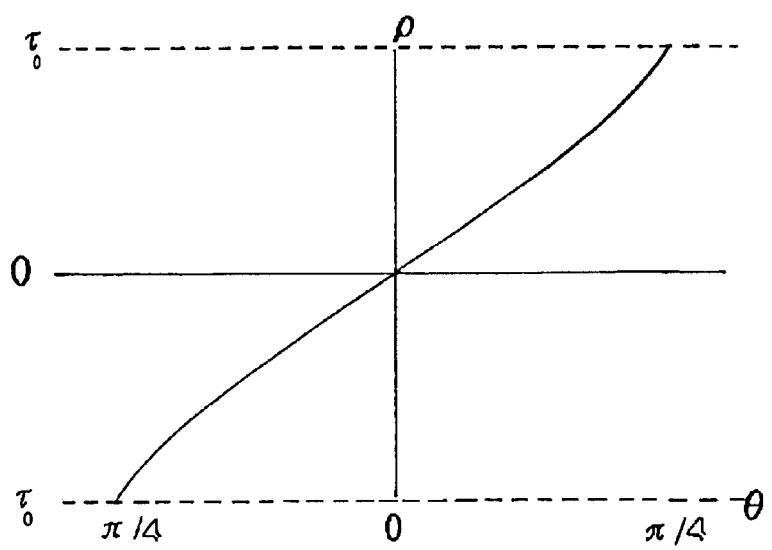
FIG. 8B is a graph illustrating the response of the probe device to the detection of tangential offset as a function of angular position.

The plot of the deflection of probe device P as a function of angular position θ for this case is illustrated in FIG. 8B. The measurement of this τ-offset value indicates that probe device P is misaligned in the τ-direction, and, as in the case of ρ-offset, can be used to detect and correct the offset. It will be noted, however, that profilometer PM has no axis of motion in the τ-direction. Hence, the τ-offset can be eliminated by slightly adjusting the position of linear slide 58 (see FIG. 2).

In practice, a combination of both ρ-offset and τ-offset can be found when making the origin alignment measurement, in which case the output of probe device P will be given as follows:

$$\rho = \rho_0 \left( \frac{1}{\cos\theta} - 1 \right) + \tau_0(\tan\theta)$$

In the case where a combination of ρ- and τ-offsets are detected, due to the potential range and complexity of the output as a function of θ, the data will need to undergo a least squares curve fit calculation to estimate $\rho_0$ or $\tau_0$ as a function of ρ and θ, or a set of several measurement iterations (i.e., measurement, adjustment, re-measurement, and so on) will need to be performed to minimize the overall error. Moreover, it is preferable to first compensate for one of the ρ- or τ-offsets, and then compensate for the other offset. For instance, the ρ-offset can be corrected first, and then the τ-offset corrected.

A better alternative to physically moving linear slide 58 to compensate for a τ-offset is to perform calculations that permit compensation to be effected through the system software as in the case of ρ-offset compensation. This can be accomplished by considering the value measured for the radial distance R' of probe tip PT from the origin, the value measured for its angular position θ' and the tangential offset distance τ of probe tip PT perpendicular to R'. In this case, R' is the measured radial coordinate of probe tip PT prior to compensation such that a compensated position R can be given by:

$$R = (R'^2 + \tau_0^2)^{1/2}$$

The new angular position is given by:

$$\theta = \theta' + \tan^{-1}\left(\frac{\tau_0}{R'}\right)$$

These calculated data can then be used by the system software to compensate for the detected offset.

Referring back to FIG. 2, after probe device P has been properly aligned with the polar origin of profilometer PM, test object O is mounted by any suitable means to mounting plate 22 of object positioning stage OPS and object positioning stage OPS is actuated in the Z-direction to bring test object O into contact with probe tip PT of probe device P. The object positioning stage OPS is then used to actuate test object O in the horizontal X and vertical Y directions while position information is being gathered by probe device P. If test object O has a generally convex shape, this is done until the maximum deflection of probe device P is found, whereupon the center position of test object O is indicated. Similarly, if test object O has a generally concave shape, object positioning stage OPS is actuated until the minimum deflection of the probe device P is found, whereupon the center position of test object O is indicated.

Figure 9:
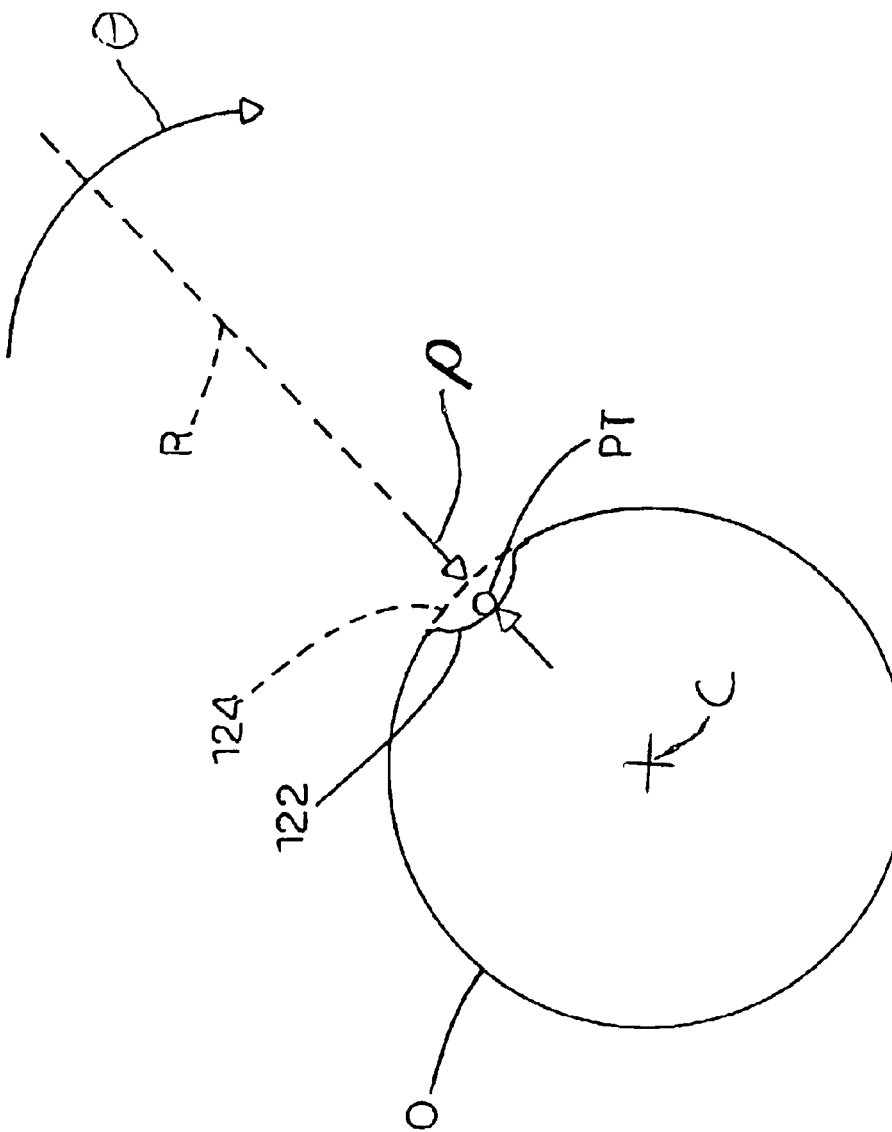
FIG. 9 is a diagram illustrating a measurement process performed by the profilometer.

With test object O thus located in three dimensions, test object O can now be located by object positioning stage OPS at a position best suited for measurement. The best location for this measurement with respect to the polar origin must be determined on the basis of the particular shape of test object O to maintain the probe tip PT in contact with the surface of test object O throughout the measurement. For example, in the simple case of a test object O with a spherical surface, the measurement would best be performed as shown in FIG. 9 with the center of curvature C of the surface located coincident with the rotational axis VA. Probe P should then deflect only minimally as linear slide LS is held in position at the radius of the spherical test object O. Once test object O has been properly located by object positioning stage OPS in preparation for being traced and measured by measurement device MD, stepper motors 24, 26 and 28 of object positioning stage OPS are de-activated. Object positioning stage OPS remains de-activated during the measurement procedure so that the position of test object O relative to object positioning stage OPS remains fixed.

According to a measurement method of the invention, with probe device P aligned with the origin and test object O positioned in contact with probe tip PT, measurement device MD initiates the tracing of probe tip PT along the outer surface of test object O and transducer 86 (see FIG. 4) of probe device P acts as a null sensor. In the case of a non-contacting probe device P, rotary stage RS and linear stage LS move probe device P to scan but not physically contact the surface of test object O. The output signals generated by transducer 86, and the positional data generated by rotary stage RS and linear stage LS of measurement device MD, are fed to electronic control device EC (see FIG. 5). As described hereinabove, electronic control device EC processes these input data to record probe deflections ρ as a function of position r, θ, transforms the data into a measured surface profile for test object O (or, in the case of a non-contacting probe device P, the variable ρ constitutes any appropriate output responsive to detected deviations or changes in the profile of the surface being measured), and displays the data as a two-dimensional error plot or any other useful expression of the measurements performed by measurement device MD. The information describing the measured surface profile produced by profilometer PM is based on polar coordinates R and θ. However, the software can be programmed to convert this information to rectangular coordinates X and Y, such as by using the following well known parametric relations: X=R cos θ and Y=R sin θ.

In a preferred aspect of the measurement procedure, data defining the nominal or expected profile of test object are inputted into the software provided with electronic control device EC prior to tracing test object O. Rotary stage RS and linear stage LS are actuated to cause probe tip PT to follow the nominal profile, with probe device P providing output informative of any deflections ρ encountered by probe tip PT as a function of position. As an example, FIG. 9 illustrates probe tip PT following the profile of a nominally hemispherical test object O. As shown in FIG. 9, probe tip PT has encountered an error region 122 on the surface of test object O. The value of the output signal transmitted by probe tip PT will correlate with the amount of radial deflections ρ between the point in error region 122 contacted by probe tip PT and the surface of a nominal profile 124 predetermined for test object O. It should be noted that during the course of this measurement process, the primary function of rotary stage RS is to cause probe tip PT to travel along the surface of test object O. The minimal force imparted by probe tip PT adjusted according to the aforementioned procedure reduces localized surface stresses, and hence minimizes deflections of the surface that could cause undesirable inaccuracies in the measurement. The primary function of linear stage LS is to maintain probe tip PT in proper contact with the surface of test object O. For this purpose, the data provided by probe device P can be utilized by electronic control device EC to adjust the radial position of linear stage LS, and hence the position of probe tip PT, while the measurement is being conducted. This radial adjustment is particularly useful when the very small stroke of probe device P is considered. By way of example, the travel distance available to probe device P is typically no greater than about ±500 microns on either side of its null position. A radial deflection ρ such as depicted in FIG. 9 might exceed the maximum travel distance of probe device P, or at least the maximum distance over which accurate readings can be taken. In such a case, linear stage LS can be actuated in real time by the motion control functionality of electronic control device EC or an associated motion control unit to adjust the radial position of probe device P during measurement, with any required radial adjustment being accounted for in the software by virtue of the fact that the polar coordinate R is the sum of the linear slide LS position r and probe deflection ρ.

$$R = r + \rho$$

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A polar coordinate-based profilometer, comprising:
   (a) a base;
   (b) a rotary stage mounted on the base and comprising a rotary table rotatable about a vertical axis oriented orthogonal to the base;
   (c) a linear stage mounted on the rotary table and rotatable therewith, the linear stage comprising a linear slide member translatable along a radial axis orthogonal to the vertical axis; and
   (d) a probe device for measuring an object, the probe device mounted on the linear slide member and extends collinear with the radial axis.

2. The profilometer according to claim 1 wherein the rotary table, the linear slide member, and a movable portion of the probe device are each movably supported by a respective air bearing.

3. The profilometer according to claim 1 wherein the rotary stage comprises a motor for driving the rotary table, a rotary encoder for detecting an angular position of the rotary table, and an air bearing supporting the rotary table.

4. The profilometer according to claim 3 wherein the motor, rotary encoder, and at least a portion of the air bearing are disposed below a top surface of the base.

5. The profilometer according to claim 1 wherein the linear stage comprises a motor for driving the linear slide member, a linear encoder for detecting a linear position of the linear slide member, and an air bearing supporting the linear slide member.

6. The profilometer according to claim 1 wherein the probe device is a contact-type probe device for contacting the object during measurement.

7. The profilometer according to claim 6 wherein the probe device comprises a linear displacement-sensing transducer and a probe tip, and the probe tip is linearly displaceable along the radial axis and communicates with the transducer.

8. The profilometer according to claim 7 wherein the probe device comprises an elongate member, the probe tip is attached to the elongate member, and the elongate member is linearly displaceable with the probe tip and communicates with the transducer.

9. The profilometer according to claim 8 wherein the transducer is a linear-variable differential transformer.

10. The profilometer according to claim 1 wherein the probe device is a non-contact-type probe device for measuring the object without contacting the object.

11. The profilometer according to claim 10 wherein the probe device comprises a sensor selected from the group consisting of optical-based sensors, capacitive-based sensors, and eddy current-based sensors.

12. The profilometer according to claim 1 comprising an electronic controller communicating with the rotary stage, linear stage, and probe device.

13. The profilometer according to claim 1 comprising a multi-axis stage device mounted on the base for positioning an object relative to the probe device.

\* \* \* \* \*